United States Patent [19]

Shuke

[11] Patent Number: 6,031,219
[45] Date of Patent: Feb. 29, 2000

[54] BIAS VOLTAGE SUPPLY CIRCUIT FOR PHOTOELECTRIC CONVERTING ELEMENT AND PHOTODETECTION CIRCUIT

[75] Inventor: Kanji Shuke, Tokyo, Japan

[73] Assignee: NEC Corporation, Tokyo, Japan

[21] Appl. No.: 09/003,158

[22] Filed: Jan. 6, 1998

[30] Foreign Application Priority Data

Jan. 7, 1997 [JP] Japan .................................. 9-000690

[51] Int. Cl.⁷ .............................. H01J 40/14; H04B 10/06
[52] U.S. Cl. .............................. 250/214 R; 250/214 A; 250/214 AG; 327/514; 359/194
[58] Field of Search .......................... 250/214 R, 214 A, 250/214 AG, 214 C, 214 DC, 214 L; 327/514, 493, 503, 422, 316, 315, 323, 325, 324, 326, 332, 52, 54, 87; 359/189, 190, 194

[56] References Cited

U.S. PATENT DOCUMENTS

| | | | |
|---|---|---|---|
| 4,467,192 | 8/1984 | Velo | 250/214 AG |
| 5,015,839 | 5/1991 | Tanikoshi | 250/214 |
| 5,625,181 | 4/1997 | Yasuda et al. | 250/214 AG |
| 5,750,980 | 5/1998 | Swithers et al. | 250/214 AG |

FOREIGN PATENT DOCUMENTS

| | | |
|---|---|---|
| 61-167231 | 7/1986 | Japan . |
| 63-55619 | 4/1988 | Japan . |
| 63-47103 | 12/1988 | Japan . |
| 6-244801 | 9/1994 | Japan . |
| 7-176782 | 7/1995 | Japan . |

*Primary Examiner*—John R. Lee
*Attorney, Agent, or Firm*—Sughrue, Mion, Zinn, Macpeak & Seas, PLLC

[57] ABSTRACT

A bias voltage supply circuit for an optical receiver includes a high-voltage generation circuit, a current detection circuit, a reference voltage generation circuit, and an operational amplifier. The high-voltage generation circuit supplies a variable bias voltage to an APD having an amplification function. The current detection circuit converts an output current, which is based on the bias voltage supplied from the high-voltage generation circuit, into a voltage signal. The reference voltage generation circuit outputs a constant reference voltage. The operational amplifier outputs a voltage control signal, corresponding to a difference between an output voltage from the current detection circuit and the reference voltage from the reference voltage generation circuit, to the high-voltage generation circuit, thereby variably controlling the bias voltage to be supplied to the photoelectric converting element. The photoelectric converting element generates a photocurrent having a constant amplitude in response to the bias voltage which is supplied from the high-voltage generation circuit upon receiving an optical input.

5 Claims, 4 Drawing Sheets

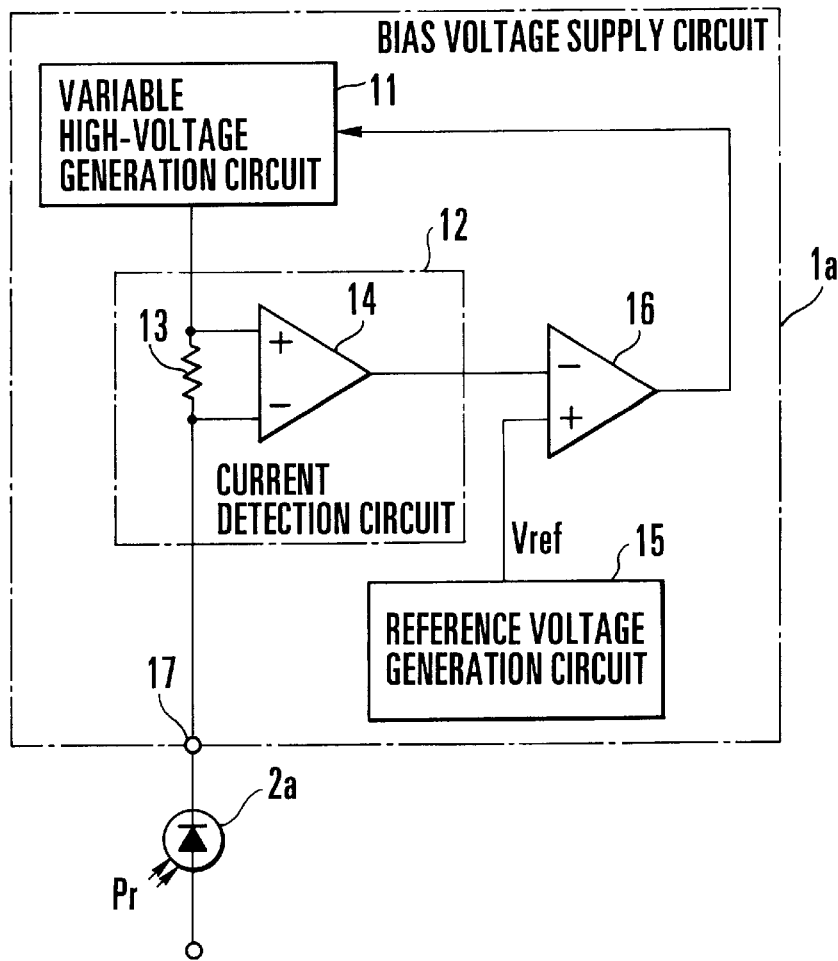
F I G. 1
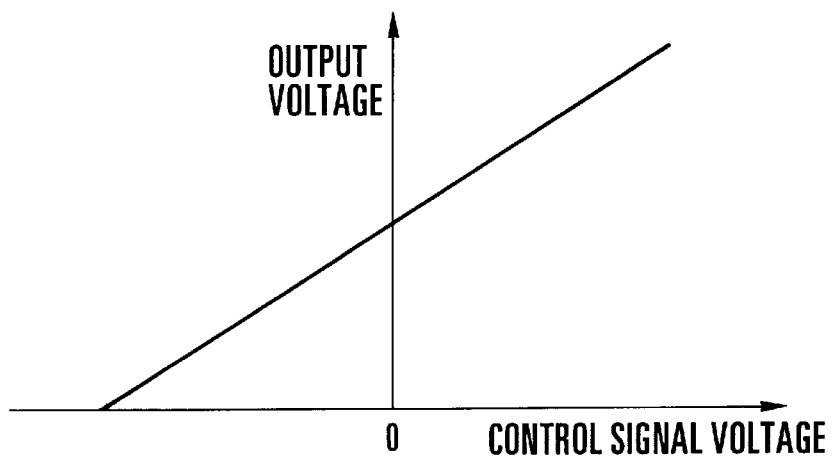
F I G. 2

BIAS VOLTAGE SUPPLY CIRCUIT FOR PHOTOELECTRIC CONVERTING ELEMENT AND PHOTODETECTION CIRCUIT

SPECIFICATION

Background of the Invention

The present invention relates to a bias voltage supply circuit for an optical receiver and, more particularly, to a bias voltage supply circuit for a two-terminal photoelectric converting element (to be referred to as an amplification type photoelectric converting element hereinafter) having an amplification function.

As a photoelectric converting element for optical communication, an avalanche photodiode (to be abbreviated as an APD hereinafter), a PIN photodiode (to be abbreviated as a PIN-PD hereinafter), or the like is used. When the APD and PIN-PD are compared, the APD is an amplification type photoelectric converting element and has a high sensitivity as high as about 10 times that of the PIN-PD but requires cost about twice that of the PIN-PD.

A conventional optical receiver using an APD as a photoelectric converting element and another conventional optical receiver using a PIN-PD as a photoelectric converting element will be described. In the following description, the optical receiver using the APD will be referred to as the APD optical receiver and the optical receiver using the PIN-PD will be referred to as the PIN-PD optical receiver.

The conventional APD optical receiver will be described. The APD requires a high-voltage source since a reverse bias near a breakdown voltage must be applied to it. Since the current amplification factor of the APD changes in accordance with a bias voltage applied to it, even if the magnitude of the optical signal changes, an electrical signal having a constant amplitude can be obtained by the feedback control of the bias voltage.

An example of the optical receiver using an APD having such a characteristic feature includes one described in U.S. Pat. No. 5,015,839. FIG. 5 shows an APD optical receiver described in this reference.

Referring to FIG. 5, a variable high-voltage generation circuit $1c$ applies a bias voltage to an APD $2c$. The APD $2c$ converts an optical signal into an electrical signal in accordance with the bias voltage. An equalizing amplifier $3c$ amplifies an output signal from the APD $2c$ and increases its voltage to such a level that can be appropriately processed by a signal processor $4c$. The signal processor $4c$ performs a processing operation, e.g., decoding an output signal from the equalizing amplifier $3c$.

The equalizing amplifier $3c$ outputs a signal VM to the variable high-voltage generation circuit $1c$. The variable high-voltage generation circuit $1c$ changes the bias voltage to be applied to the APD $2c$ with the signal VM, thereby controlling the amplitude of the electrical signal output from the APD $2c$.

The operation of the equalizing amplifier $3c$ will be further described. The output signal from the APD $2c$ is amplified by a preamplifier $31c$ and a variable gain control amplifier $32c$, and is output to the signal processor $4c$. A peak detection circuit $33c$ detects the peak voltage of an output signal from the variable gain control amplifier $32c$. An operational amplifier $35c$ compares a peak voltage signal output from the peak detection circuit $33c$ and a reference voltage signal output from a reference voltage source $34c$, amplifies a signal corresponding to the voltage difference between the peak voltage signal and reference voltage signal, and outputs the amplified signal to a controller $36c$. Based on the signal from the operational amplifier $35c$, the controller $36c$ controls the gain of the variable gain control amplifier $32c$ with a signal VA, and controls the bias voltage for the APD $2c$, which is output from the variable high-voltage generation circuit $1c$, with the signal VM.

The conventional PIN-PD optical receiver will be described. Different from the APD, the PIN-PD does not require a high bias voltage or feedback control of the bias voltage. FIG. 6 shows the arrangement of the conventional PIN-PD optical receiver.

Referring to FIG. 6, a constant voltage source $1d$ applies a bias voltage to a PIN-PD $2d$. The PIN-PD $2d$ converts an optical signal into an electrical signal. A current-to-voltage converting amplifier $31d$ of an equalizing amplifier $3d$ converts a current signal output from the PIN-PD $2d$ into a voltage signal and amplifies the voltage signal. A threshold is set in a limiting amplifier $32d$ of the equalizing amplifier $3d$. If the voltage of the output signal from the current-to-voltage converting amplifier $31d$ is higher than the threshold, the limiting amplifier $32d$ outputs a logic "1"; inversely, if it is lower than the threshold, the limiting amplifier $32d$ outputs a logic "0". The signal output from the limiting amplifier $32d$ is amplified to such a voltage level that can be processed by a signal processor $4d$. The signal processor $4d$ performs a processing operation, e.g., decoding the output signal from the equalizing amplifier $3d$.

In the current trend for cost reduction, components must be shared. This also applies to an optical receiver for optical communication. In the conventional optical receiver, however, the peripheral circuits of the photoelectric converting element cannot be shared between the APD optical receiver and the PIN-PD optical receiver. This is because the APD optical receiver and the PIN-PD optical receiver require different power sources that apply bias voltages, and because the APD optical receiver requires an exclusive feedback circuit, when the APD is used, in order to feedback-control the bias voltage of the APD based on the voltage amplitude of the equalized/amplified signal.

SUMMARY OF THE INVENTION

It is an object of the present invention to provide a bias voltage supply circuit for an amplification type photoelectric converting element, which can reduce the production cost of the optical receiver.

In order to achieve the above object, according to the present invention, there is provided a bias voltage supply circuit for an optical receiver, comprising a high-voltage generation circuit for supplying a variable bias voltage to a two-terminal photoelectric converting element having an amplification function, a current detection circuit for converting an output current, which is based on the bias voltage supplied from the high-voltage generation circuit, into a voltage signal, a reference voltage generation circuit for outputting a constant reference voltage, and a first operational amplifier for outputting a voltage control signal, corresponding to a difference between an output voltage from the current detection circuit and the reference voltage from the reference voltage generation circuit, to the high-voltage generation circuit, thereby variably controlling the bias voltage to be supplied to the photoelectric converting element, wherein the photoelectric converting element generates a photocurrent having a constant amplitude in response to the bias voltage which is supplied from the high-voltage generation circuit upon receiving an optical input.

BRIEF DESCRIPTION OF THE DRAWINGS

FIG. 1 is a block diagram showing the arrangement of a bias voltage supply circuit using an avalanche photodiode (APD) according to an embodiment of the present invention;

FIG. 2 is a graph showing the output voltage vs. control voltage characteristics of the variable high-voltage generation circuit shown in FIG. 1;

DESCRIPTION OF THE PREFERRED EMBODIMENT

Figure 3:
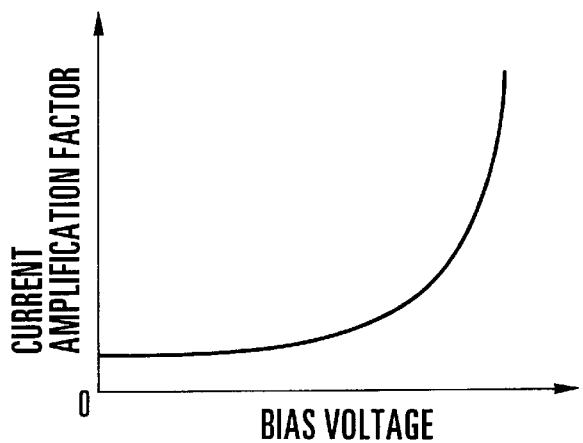
FIG. 3 is a graph showing the current amplification factor vs. bias voltage characteristics of the APD shown in FIG. 1.

The present invention will be described in detail with reference to the accompanying drawings.

FIG. 1 shows a bias voltage supply circuit for an APD according to an embodiment of the present invention. Referring to FIG. 1, a bias voltage supply circuit 1a is constituted by a variable high-voltage generation circuit 11, a current detection circuit 12, a reference voltage generation circuit 15, an operational amplifier 16, and an output terminal 17. The current detection circuit 12 is connected between the variable high-voltage generation circuit 11 and the output terminal 17, and its output terminal is connected to the inverting input terminal of the operational amplifier 16. The output terminal of the reference voltage generation circuit 15 is connected to the noninverting input terminal of the operational amplifier 16. The output terminal of the operational amplifier 16 is connected to the variable high-voltage generation circuit 11.

The current detection circuit 12 is constituted by, e.g., a resistor 13 and an operational amplifier 14. The resistor 13 is connected between the variable high-voltage generation circuit 11 and output terminal 17. The inverting and noninverting input terminals of the operational amplifier 14 are connected to the two terminals of the resistor 13, respectively, and the output terminal of the operational amplifier 14 is connected to the inverting input terminal of the operational amplifier 16. The output terminal 17 of the bias voltage supply circuit la is connected to an APD 2a.

The variable high-voltage generation circuit 11 can output a high voltage within a range enough to control the current amplification factor of the APD 2a employed. The resistor 13 of the current detection circuit 12 has a resistance R that does not almost cause an apparent voltage difference between the output voltage of the variable high-voltage generation circuit 11 and the output voltage of the bias voltage supply circuit 1a.

The operational amplifiers 14 and 16 can amplify respective signals so that their output signals have such voltages that can be treated easily, have sufficiently high gains not to cause an apparent potential difference between the their inverting and noninverting terminals, and have time constants and gains not to oscillate a feedback circuit constituted by the variable high-voltage generation circuit 11 and the operational amplifiers 14 and 16. The reference voltages generation circuit 15 can change a reference voltage Vref as its output voltage.

FIG. 2 shows the output voltage vs. control voltage characteristics of the variable high-voltage generation circuit 11. As shown in FIG. 2, the variable high-voltage generation circuit 11 linearly changes the output voltage with respect to the voltage of the control signal output from the operational amplifier 16.

In the bias voltage supply circuit 1a shown in FIG. 1, since the outputs from the current detection circuit 12 and the reference voltage generation circuit 15 are respectively input to the inverting and noninverting input terminals of the operational amplifier 16, the graph of FIG. 2 forms a straight line which ascends to the right. Inversely, when the respective outputs of the current detection circuit 12 and the reference voltage generation circuit 15 are input to the noninverting and inverting input terminals of the operational amplifier 16, the graph of the output voltage with respect to the control voltage of the variable high-voltage generation circuit 11 forms a straight line which descends to the right.

FIG. 3 shows the current amplification factor vs. bias voltage characteristics of the APD 2a. As shown in FIG. 3, the higher the bias voltage applied to the APD 2a, the more the current amplification factor increases in the form of a quadratic curve.

The operation of the bias voltage supply circuit 1a and APD 2a shown in FIG. 1 will be described with reference to FIGS. 2 and 3.

When an optical input Pr is input to the APD 2a connected to the output terminal 17 of the bias voltage supply circuit 1a, a photocurrent Ir expressed by $$Ir = Pr \cdot M \cdot \eta \cdot \epsilon / (h \cdot \nu)$$

flows from the cathode to anode of the APD 2a, where M is the current amplification factor of the APD 2a, $\eta$ is the quantum efficiency of the APD 2a, $\epsilon$ is the unit charge, h is the Planck constant, and $\nu$ is the frequency of light.

At this time, the photocurrent Ir flows to the current detection circuit 12 of the bias voltage supply circuit 1a as well. Accordingly, a potential difference Ir·R occurs between the two terminals of the resistor 13 of the resistance R of the current detection circuit 12. Assuming that the gain of the operational amplifier 14 of the current detection circuit 12 is defined as A (A>1), the operational amplifier 14 amplifies the potential difference Ir·R occurring between the two terminals of the resistor 13 and supplies an output voltage A·Ir·R to the inverting input terminal of the operational amplifier 16. A reference voltage Vref of the reference voltage generation circuit 15 is supplied to the noninverting input terminal of the operational amplifier 16. Assuming that the gain of the operational amplifier 16 is defined as B (B>1), the operational amplifier 16 outputs a voltage B·(Vref−A·Ir·R), obtained by multiplying the difference between the reference voltage Vref and the output voltage A·Ir·R from the operational amplifier 14 by B. to the variable high-voltage generation circuit 11 as a control signal.

As shown in FIG. 2, when the voltage B·(Vref−A·Ir·R) of the control signal is positive, the variable high-voltage generation circuit 11 outputs a voltage higher than that which is output when the voltage B·(Vref−A·Ir·R) of the control signal is zero. When the output voltage from the variable high-voltage generation circuit 11 increases, the output voltage from the bias voltage supply circuit 1a increases accordingly, and a higher bias voltage is applied to the APD 2a. When the bias voltage of the APD 2a increases, the current amplification factor of the APD 2a increases, as shown in FIG. 3, and the photocurrent Ir flowing to the APD 2a increases accordingly. When the photocurrent Ir flowing to the APD 2a increases, the output voltage A·Ir·R of the operational amplifier 14 increases, and the voltage B·(Vref−A·Ir·R) of the control signal becomes close to zero.

Inversely, as shown in FIG. 2, when the voltage B·(Vref−A·Ir·R) of the control signal is negative, the variable high-voltage generation circuit 11 outputs a voltage lower than that which is output when the voltage B·(Vref−A·Ir·R) of the control signal is zero. As a result, the bias voltage applied to the APD 2a decreases, the current amplification factor of the APD 2a decreases, as shown in FIG. 3, and accordingly the photocurrent Ir flowing to the APD 2a decreases. Therefore, the voltage B·(Vref−A·Ir·R) of the control signal becomes close to zero also in this case.

In this manner, the feedback system constituted by the variable high-voltage generation circuit 11 and operational amplifiers 14 and 16 is stabilized such that Vref=A·Ir·R is established. Therefore, if the resistance R of the resistor 13 of the current detection circuit 12, the gain A of the operational amplifier 14, and the reference voltage Vref output from the reference voltage generation circuit 15 are set at constant values, a constant photocurrent Ir (=Vref/(A·R)) can be obtained regardless of a change in optical input Pr of the APD 2a.

In order to describe the operation of the bias voltage supply circuit 1a and APD 2a shown in FIG. 1 in more detail, the various numerical values of the bias voltage supply circuit 1a and APD 2a are set as follows.

More specifically, the resistance R of the resistor 13 and the gain A of the operational amplifier 14 in the current detection circuit 12 are set to 100 Ω and 10,000, respectively. The reference voltage Vref output from the reference voltage generation circuit 15 is set to 1 V. The gain B of the operational amplifier 16 is set to 10,000, and the voltage range of the control signal output from the operational amplifier 16 is set to −5 to +5 V. The range of voltage output from the variable high-voltage generation circuit 11 is set to 0 to 50 V. When a control signal of −5 V is input to the variable high-voltage generation circuit 11, the variable high-voltage generation circuit 11 outputs 0 V. When a control signal of +5 V is input to the variable high-voltage generation circuit 11, the variable high-voltage generation circuit 11 outputs 50 V.

Concerning the APD 2a employed, the relationship between the applied bias voltage and the current amplification factor M is as follows. When the bias voltage is 0 V, the current amplification factor M is 1. When the bias voltage is 50 V, the current amplification factor M is 50. Assume that the quantum efficiency η of the APD 2a is set to 0.95.

Also, $\epsilon/(h \cdot v)$ is set to 1.056.

At this time, the bias voltage supply circuit 1a and APD 2a operate in the following manner. When no optical input Pr is input to the APD 2a, i.e., when the optical input Pr is 0 W, no photocurrent Ir is generated in the APD 2a. No current flows to the current detection circuit 12 of the bias voltage supply circuit 1a accordingly, and no potential difference occurs between the two terminals of the resistor 13 of the current detection circuit 12. Therefore, the output voltage from the operational amplifier 14 of the current detection circuit 12 is 0 V.

The reference voltage generation circuit 15 constantly outputs a reference voltage of 1 V, and the potential difference between the two inputs to the operational amplifier 16 is 1 V accordingly. Although the gain B of the operational amplifier 16 is 10,000, as the upper limit of the voltage of the control signal output from the operational amplifier 16 is +5 V, the operational amplifier 16 outputs a control signal of +5 V. Therefore, the variable high-voltage generation circuit 11 outputs a voltage of 50 V. At this time, since the bias voltage applied to the APD 2a is also 50 V, the current amplification factor M of the APD 2a is set to 50.

Assume that an optical input Pr of 0.0001 mW is input to the APD 2a. Since the photocurrent Ir generated in the APD 2a is expressed as $Pr \cdot M \cdot \eta \cdot \epsilon/(h \cdot v)$, a photocurrent Ir of 0.005 mA is generated.

At this time, a current of 0.005 mA flows also to the current detection circuit 12 of the bias voltage supply circuit 1a. However, since the bias voltage applied to the APD 2a is feedback-controlled based on the current flowing to the current detection circuit 12, the photocurrent Ir generated in the APD 2a is stabilized at Vref/(A·R), i.e., 0.001 mA.

Figure 5:
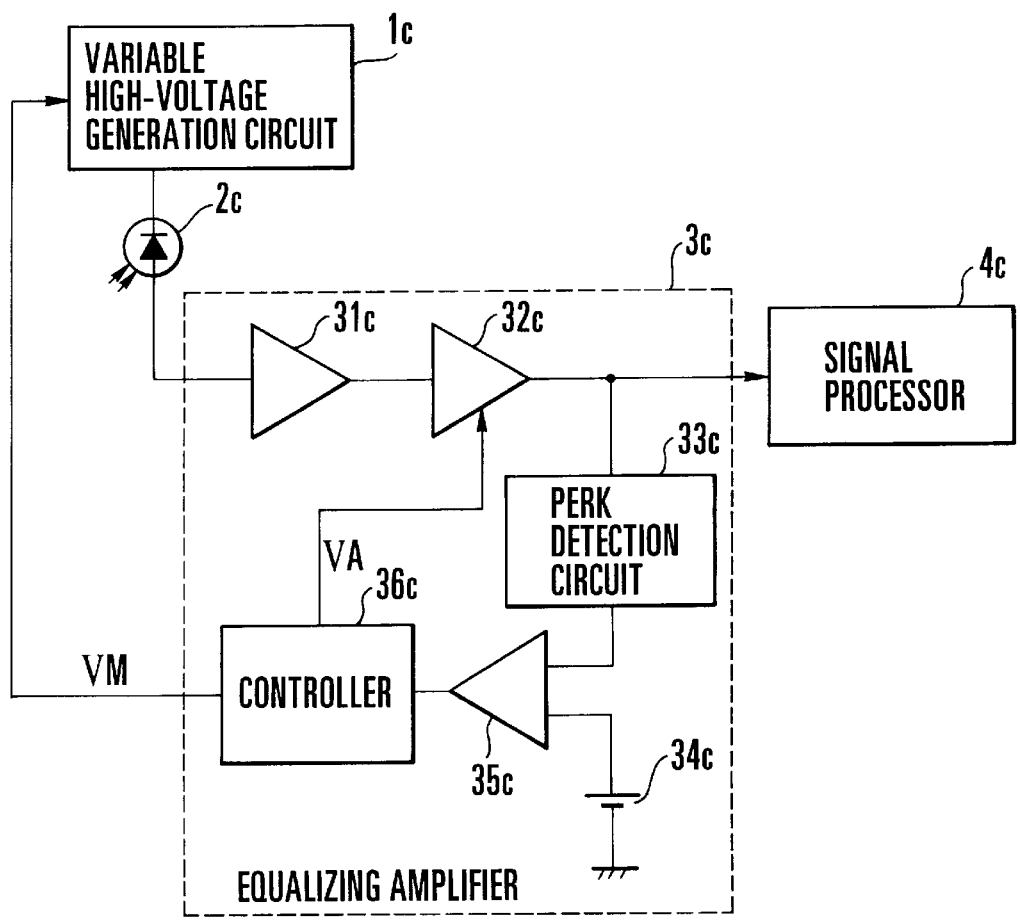
FIG. 5 is a block diagram of a conventional APD optical receiver.
Figure 6:
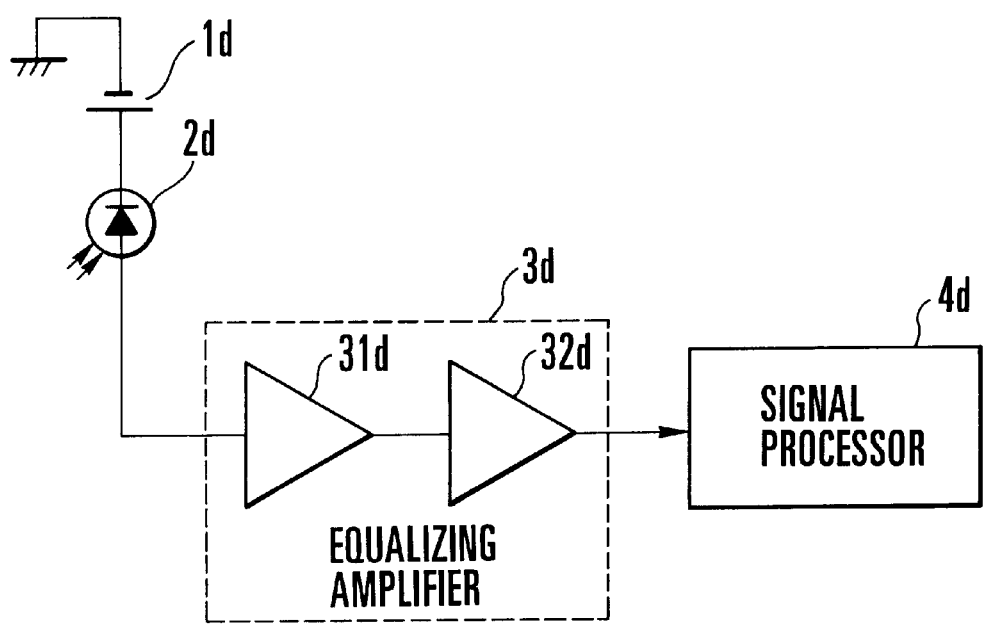
FIG. 6 is a block diagram of a conventional PIN-PD optical receiver.

As described above, the bias voltage supply circuit 1a shown in FIG. 1 performs feedback control within its circuit and changes the bias voltage of the APD 2a such that the amplitude of the photocurrent Ir generated in the APD 2a becomes constant. For this reason, different from the equalizing amplifier 3a of the conventional APD optical receiver shown in FIG. 5, the equalizing amplifier in the APD optical receiver employing the bias voltage supply circuit 1a does not require a function of controlling the bias voltage of the APD 2a. This allows the equalizing amplifier 3d of the PIN-PD optical receiver shown in FIG. 6 to be used as the equalizing amplifier of the APD optical receiver. Since the equalizing amplifier 3d is constituted by only the current-to-voltage converting amplifier 31d and the limiting amplifier 32d, the equalizing amplifier of the APD optical receiver can be greatly simplified.

Figure 4:
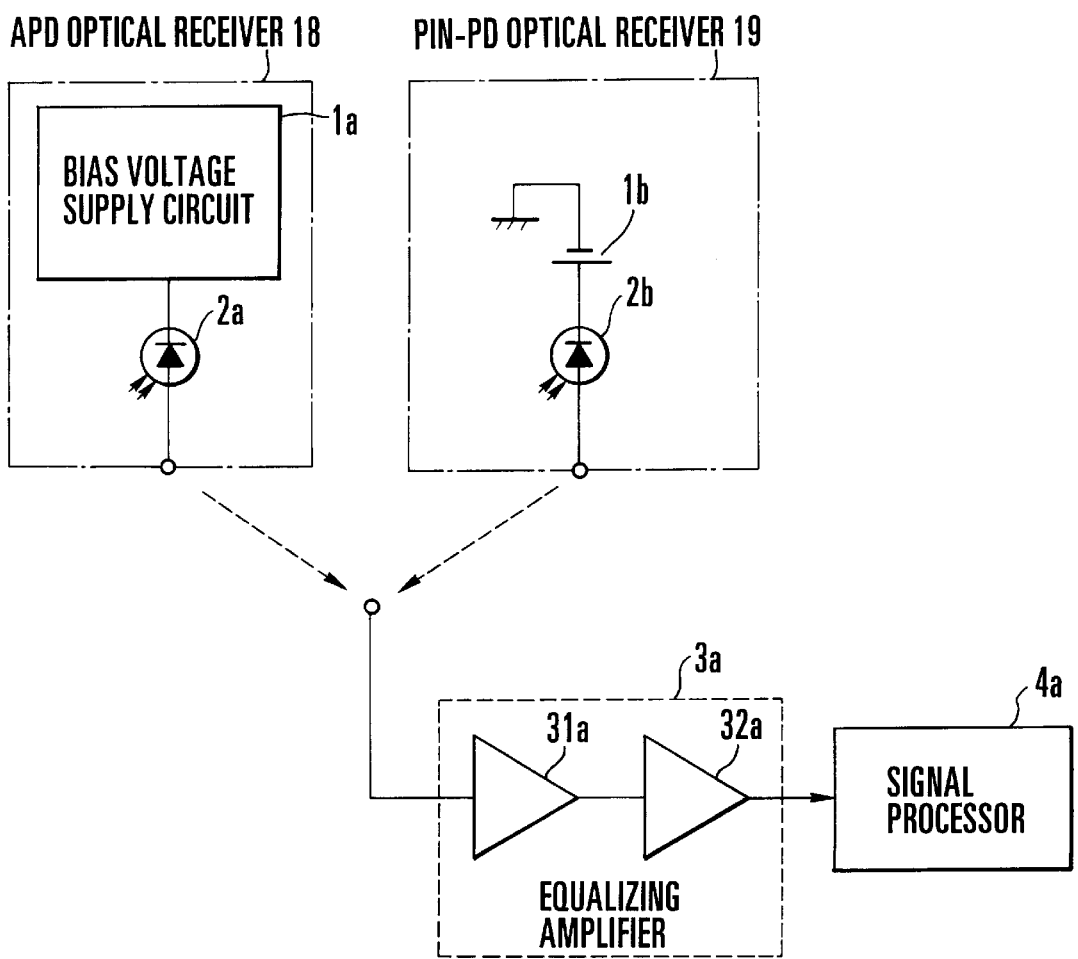
FIG. 4 is a diagram showing a state wherein circuits are shared between an APD optical receiver employing a bias voltage supply circuit according to the present invention, and a PIN-PD optical receiver.

FIG. 4 shows how circuits are shared between the APD optical receiver employing the bias voltage supply circuit 1a shown in FIG. 1 and the PIN-PD optical receiver. As shown in FIG. 4, if the bias voltage supply circuit 1a is employed in an APD optical receiver 18, an equalizing amplifier 3a and a signal processor 4a can be shared between the APD optical receiver 18 and a PIN-PD optical receiver 19. If circuits are shared, the production efficiency is improved, and accordingly the production cost of the optical receiver can be reduced.

In this case, the equalizing amplifier 3a is constituted by a current-to-voltage converting amplifier 31a and a limiting amplifier 31b, and amplifies an output signal from the APD optical receiver 18 or PIN-PD optical receiver 19 up to such a voltage that can be appropriately processed by the signal processor 4a. The signal processor 4a performs a processing operation, e.g., decoding the output signal from the equalizing amplifier 3a. The operations of the equalizing amplifier 3a and the signal processor 4a are identical to those of the equalizing amplifier 3d and the signal processor 4d shown in FIG. 6, and a detailed description thereof will be omitted.

The optical receiver that uses an APD as a photoelectric converting element has been described above. However, the photoelectric converting element to which the bias voltage supply circuit according to the present invention applies a bias voltage is not limited to an APD. It suffices as far as the photoelectric converting element is an amplification type photoelectric converting element.

As has been described above, the bias voltage supply circuit according to the present invention controls the output voltage from a high-voltage generation circuit such that no voltage difference is present between the voltage signal output from the current detection circuit and the voltage signal output from the reference voltage generation circuit. The output current of the amplification type photoelectric converting element connected to this bias voltage supply circuit becomes constant regardless of a change in optical input. That is, the output current of the amplification type photoelectric converting element can be controlled even if feedback control from the equalizing amplifier is not performed.

Therefore, according to the present invention, circuits can be shared between an optical receiver employing an amplification type photoelectric converting element and an optical receiver employing a PIN-PD. This increases the production efficiency of the optical receiver, so that the production cost of the optical receiver can be reduced.

What is claimed is:

1. A bias voltage supply circuit for an optical receiver, comprising:
   a high-voltage generation circuit for supplying a variable bias voltage to a two-terminal photoelectric converting element having an amplification function;
   a current detection circuit coupled to an output of said high-voltage generation circuit for converting an output current, produced in response to the bias voltage supplied from said high-voltage generation circuit, into an input voltage signal;
   a reference voltage generation circuit for outputting a constant reference voltage; and
   a first operational amplifier for outputting a voltage control signal, corresponding to a difference between an output voltage from said current detection circuit and the reference voltage from said reference voltage generation circuit, to said high-voltage generation circuit, thereby variably controlling the bias voltage to be supplied to said photoelectric converting element,
   wherein said photoelectric converting element generates a photocurrent having a constant amplitude in response to the bias voltage which is supplied from said high-voltage generation circuit upon receiving an optical input.

2. A circuit according to claim 1, wherein said photoelectric converting element is an avalanche photodiode.

3. A circuit according to claim 1, wherein said current detection circuit comprises
   a resistor element connected in series with a supply line of the bias voltage supplied from said variable high-voltage generation circuit to said photoelectric converting element, and
   a second operational amplifier for amplifying a potential difference occurring between two terminals of said resistor element and outputting the amplified potential difference to said first operational amplifier.

4. A photodetection circuit comprising:
   a first optical receiver employing an avalanche photodiode;
   an equalizing amplifier for amplifying an output voltage from said optical receiver; and
   a signal processor for decoding an output from said equalizing amplifier,
   wherein said first optical receiver comprises
   a high-voltage generation circuit for supplying a variable bias voltage to said avalanche photodiode;
   a current detection circuit coupled to an output of said high voltage generation circuit for converting an output current, produced in response to the bias voltage supplied from said high-voltage generation circuit, into an input voltage signal;
   a reference voltage generation circuit for outputting a constant reference voltage; and
   an operational amplifier for outputting a voltage control signal, corresponding to a difference between an output voltage from said current detection circuit and the reference voltage from said reference voltage generation circuit, to said high-voltage generation circuit, thereby variably controlling the bias voltage to be supplied to said avalanche photodiode, and
   said avalanche photodiode generates a photocurrent having a constant amplitude in response to the bias voltage which is supplied from said high-voltage generation circuit upon receiving an optical input.

5. A circuit according to claim 4, further including means for sharing said equalizing amplifier and said signal processor between said first optical receiver and a second optical receiver employing a PIN photodiode.

* * * * *